United States Patent [19]
Ishikawa et al.

[11] Patent Number: 6,024,463
[45] Date of Patent: Feb. 15, 2000

[54] SURFACE LIGHT SOURCE DEVICE OF SIDE LIGHT TYPE WITH BELT-LIKE DIFFUSIBLE AREA

[75] Inventors: Tsuyoshi Ishikawa; Hiromi Sasako, both of Tokyo, Japan

[73] Assignees: Enplas Corporation, Kawaguchi; Yasuhiro Koike, Yokohama, both of Japan

[21] Appl. No.: 08/966,451

[22] Filed: Nov. 7, 1997

[30] Foreign Application Priority Data

Nov. 12, 1996 [JP] Japan .................................. 8-315554
Nov. 25, 1996 [JP] Japan .................................. 8-329202

[51] Int. Cl.$^7$ ........................................ F21V 7/04
[52] U.S. Cl. ........................ 362/31; 362/299; 362/308
[58] Field of Search .......................... 362/31, 298, 299, 362/300, 301, 307, 308

[56] References Cited

U.S. PATENT DOCUMENTS

| | | | |
|---|---|---|---|
| 4,277,817 | 7/1981 | Hehr | 362/31 |
| 5,178,447 | 1/1993 | Murase | 362/31 |
| 5,283,673 | 2/1994 | Murase et al. . | |
| 5,392,199 | 2/1995 | Kashima | 362/31 |
| 5,600,455 | 2/1997 | Ishikawa | 349/57 |
| 5,688,035 | 11/1997 | Kashima et al. . | |
| 5,788,356 | 8/1998 | Watai et al. . | |

FOREIGN PATENT DOCUMENTS 7-198956  8/1995  Japan .

*Primary Examiner*—Sandra O'Shea
*Assistant Examiner*—Marshall Honeyman
*Attorney, Agent, or Firm*—Staas & Halsey, LLP

[57] ABSTRACT

In a surface light source device of side light type applied to a liquid crystal display device, etc., more specifically a surface light source device of side light type having a directivity emitting characteristic, a bright-and-dark-band contrast which is generated in a vicinity of an incidence surface is prevented. In a surface light source device of side light type, light diffusible areas composed on main-and-supplementary diffusible areas are formed on a slanted surface and an emitting surface of a light guide plate having a directivity emitting characteristic. A silver sheet is fixed to a projected portion of a prism sheet along an upper edge, and an illumination light which arrives at the upper edge from a fluorescent lamp is blocked so that the strong brightening of the upper edge is prevented. An illumination light form a lower edge is blocked by a reflector or a frame and reflected diffusively. The light diffusible area may be formed on one of the slanted surface and the emitting surface. Moreover, the light diffusible area may be formed on an additional element such as a reflection sheet.

17 Claims, 7 Drawing Sheets

10: SURFACE LIGHT SOURCE DEVICE OF SIDE LIGHT TYPE

10: SURFACE LIGHT SOURCE DEVICE OF SIDE LIGHT TYPE

1: SURFACE LIGHT SOURCE DEVICE OF SIDE LIGHT TYPE

20 : SURFACE LIGHT SOURCE DEVICE OF SIDE LIGHT TYPE

SURFACE LIGHT SOURCE DEVICE OF SIDE LIGHT TYPE WITH BELT-LIKE DIFFUSIBLE AREA

BACKGROUND

1. Field of the Invention

The present invention relates to a surface light source device of side light type, more specifically, relates to a surface light source device of side light type in which uniformity of luminance is improved. The present invention is applied to back lighting of a liquid crystal display device, for example.

2. Related Art

A surface light source device of side light type has been conventionally applied to a liquid crystal display device, for example, and this device illuminates a liquid crystal panel from a back surface. Its arrangement is suitable for thinning the whole form of the device.

In the surface light source device of side light type, a rod-type light source such as a cold cathode tube is employed as a primary light source, and it is arranged beside a light guide plate (plate-type member composed of a light guide material). An illumination light emitted from the primary light source is guided into the light guide plate through the side end surface of the light guide plate. The guided illumination light is propagated through the light guide plate, and according to this process, the light is emitted from a major surface of the light guide plate to the liquid crystal panel.

As the light guide plate employed in the surface light source device of side light type, a plate having substantially uniform thickness, and a plate whose thickness tends to become smaller with going away from the primary light source are known. In general, the latter plate emits an illumination light more efficiently than the former plate.

FIG. 3 is an assembly perspective view showing the surface light source device of side light type using the latter light guide plate. Moreover, FIG. 4 is a cross section taken along line A—A in FIG. 3. Referring to both the drawings, a surface light source device of side light type 1 has a light scattering guide plate (light guide plate composed of a light scattering guide material) 2, a primary light source 3 arranged beside the light guide plate 2, a reflection sheet 4 and prism sheet 5 as a directional characteristic correcting member. The reflection sheet 4, light guide plate 2 and prism sheet 5 are laminatedly arranged.

The primary light source 3 has a cold cathode tube (fluorescent lamp) 8 and a reflection member (reflector) 9 having an approximately semicircular cross section arranged in the circumference of the cold cathode tube 8. An illumination light enters the side end surface of the light scattering guide plate 2 through an opening of the reflector 9. As the reflection sheet 4, a sheet-like regular reflection member composed of metallic foil, etc. or sheet-like irregular reflection member composed of a white PET film, etc. are employed.

The light scattering guide plate 2 has a wedge-shaped cross section, and it is composed of a matrix composed of polymethyl methacrylate (PMMA), for example, and transparent corpuscles which are dispersed uniformly in the matrix and whose refractive index is different from that of the matrix.

As illustrated by a zig-zag line in FIG. 4, an illumination light L from the primary light source 3 is guided into the light scattering guide plate 2 through an incidence surface 2A which is one side end surface of the light scattering guide plate 2. While the guided illumination light L is reflected repeatedly between a major surface 2B along the reflection sheet 4 (hereinafter, referred to as "slanted surface") and a major surface along the prism sheet 5 (hereinafter, referred to as "emitting surface") 2C, the illumination light L is propagated towards the end. At this time, the illumination light L is influenced by a scattering action due to transparent corpuscles. If the reflection sheet 4 composed of the irregular reflection member is employed, the illumination light L is influenced also by an irregular reflecting action.

As the illumination light L is reflected repeatedly on the slanted surface 2B, an incidence angle with respect to the emitting surface becomes smaller gradually. The decrease in the incidence angle increases a component of not more than a critical angle with respect to the emitting surface, and the emission from the emitting surface 2C is improved. As a result, insufficient emitting light is prevented in a region far from the primary light source 3.

Since the illumination light emitted from the emitting surface 2C has been scattered by the transparent corpuscles or has been reflected irregularly by the reflection sheet 4, it has a property of scattered light. However, the main propagating direction of the emitted illumination light is slanted to an end direction with respect to the emitting surface (opposite direction to the primary light source 3). Namely, the emitting light has directivity. The surface light source device of side light type 1 using such a light guide plate generates an illumination light having a directional emitting characteristic.

The prism sheet 5 is formed by a transparent sheet material such as polycarbonates, and the prism surface is formed on both of the surfaces. The prism sheet 5 is arranged so that its prism surfaces face towards the light scattering guide plate 2. The two prism surfaces are composed of a plurality of convex portions having rectangular cross sections which are extended approximately parallel with or vertically to the incidence surface 2A of the light scattering guide plate 2. The extending directions of the convex portions on both the prism surfaces intersect perpendicularly to each other, but they are occasionally parallel with each other.

The prism sheet 5 corrects the main emitting direction of the emitting light to a frontal direction of the emitting surface on the slanted surface of each convex portion. A prism sheet having the prism surface only on one side is occasionally employed. In this case, the extending direction of the convex portions is generally parallel with the incidence surface 2A.

In general, the surface light source device of side light type 1 employing such a wedge-shaped light guide plate emits an emitting light to the frontal direction more efficiently than the surface light source device of side light type employing the light guide plate having substantially uniform thickness.

Here, the surface light source device of side light type can adopt a light guide plate in which a scattering film, rough surface, etc. are formed on one or both of the major surfaces (emitting surface and/or rear surface) of a wedge-shaped or wedge-like-shaped transparent and semi-transparent member as the light guide plate having the directional emitting characteristic. Such a light guide plate also emits an emitting light to the frontal direction efficiently.

The surface light source device of side light type 1 employing the light guide plate having the aforementioned directional emitting characteristic causes an unsolved problem such that nonuniformity of luminance occurs on the emitting surface 2C. The nonuniformity of luminance, as shown in FIG. 3, occurs in a form of bright band in which the luminance level is relatively high and dark band in which the luminance level is relatively low. The bright-and-dark-band contrast tends to appear in the vicinity of the incidence surface 2A so as to be substantially parallel with the incidence surface 2A.

According to a method to solve the above problem, a light diffusible surface is formed on the incidence surface 2A. However, this method cannot restrain the bright-and-dark-band contrast sufficiently in some forms of the light scattering guide plate.

OBJECT AND SUMMARY OF THE INVENTION

It is an object of the present invention to provide a surface light source device of side light type in which nonuniformity of luminance causing the above band-type bright-and-dark contrast is suppressed and thus the luminance is made to be uniform.

The present invention is applied to the surface light source device of side light type which has a light guide plate including an incidence surface, emitting surface and surface opposite with the emitting surface, and has a rod-type light source arranged along the incidence surface for supplying a light from the side of the light guide plate.

According to a feature of the present invention, a light diffusible area for preventing a bright--and-dark-band contrast from appearing, for one or both of the emitting surface of the light guide plate and the surface opposite with the emitting surface, is provided in a belt so as to be parallel with the incidence surface.

It is preferable that the light diffusible area includes a main diffusible area and a supplementary diffusible area which is adjacent to the main diffusible area and serves as a buffer area for avoiding light diffusibility from being changed.

The light diffusible area, which is formed on the emitting surface and/or the surface opposite with the emitting surface, may be formed on their surfaces, but may be formed on an element additionally arranged along their surfaces. For example, the light diffusible area for the emitting surface may be formed on a directional characteristic correcting member such as a prism sheet. Moreover, the light diffusible area for the surface opposite to the emitting surface may be formed on a reflection member.

It is preferable that the light guide plate has a cross sectional form such that its thickness becomes thinner gradually with going away from the incidence surface. Moreover, it is preferable that the light guide plate is composed of a light guide material (light scattering guide material) having a light scattering characteristic therein.

According to the present invention, in a surface light source device of side light type, more specifically a surface light source device of side light type having a directivity emitting characteristic, a bright-and-dark-band contrast, which is generated in the vicinity of the incidence surface of the light guide plate, is prevented.

The above and further features of the invention will more fully be apparent from the following detailed description with accompanying drawings.

PREFERRED EMBODIMENTS

Figure 3:
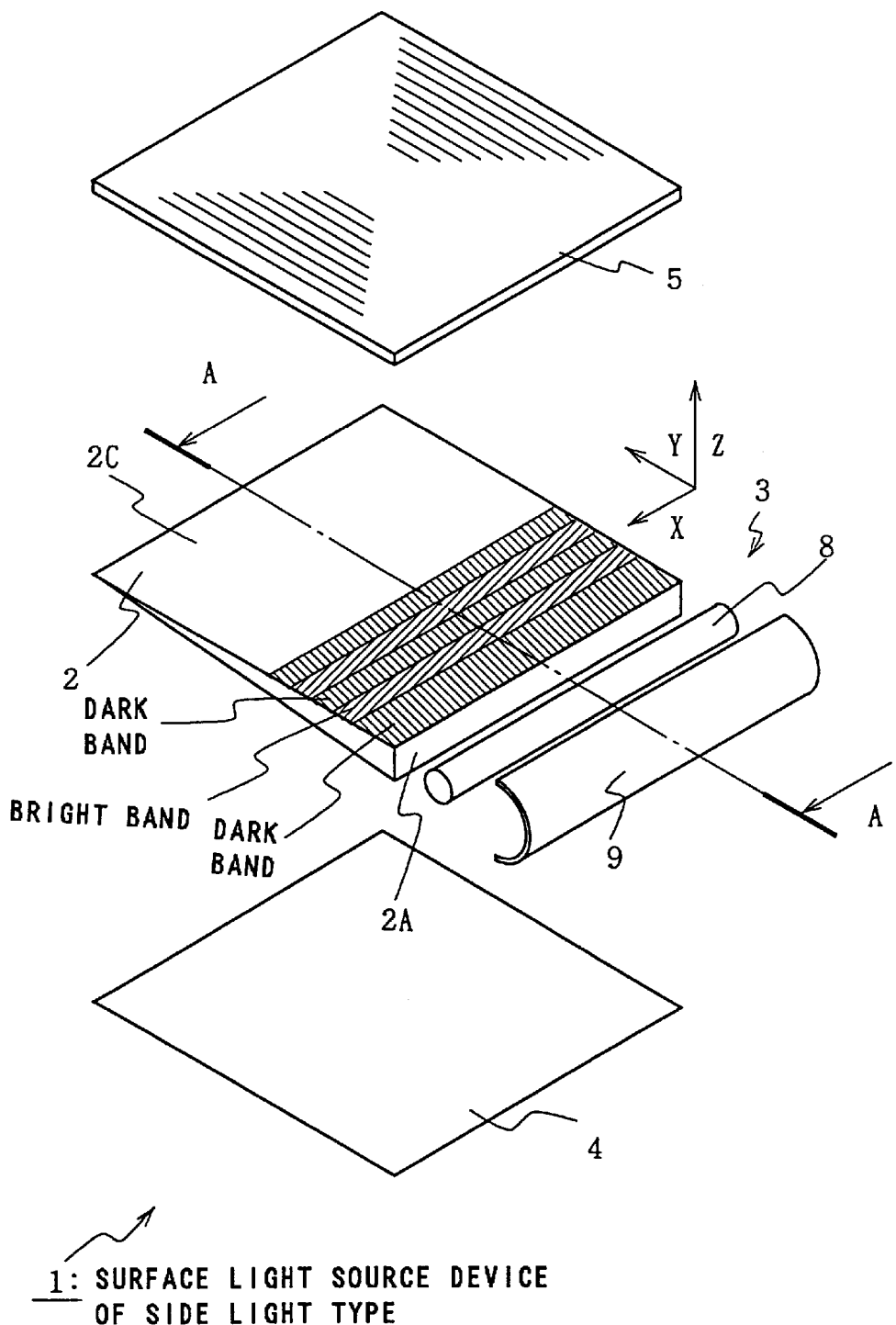
FIG. 3 is an assembly perspective view showing a conventional surface light source device of side light type.
Figure 4:
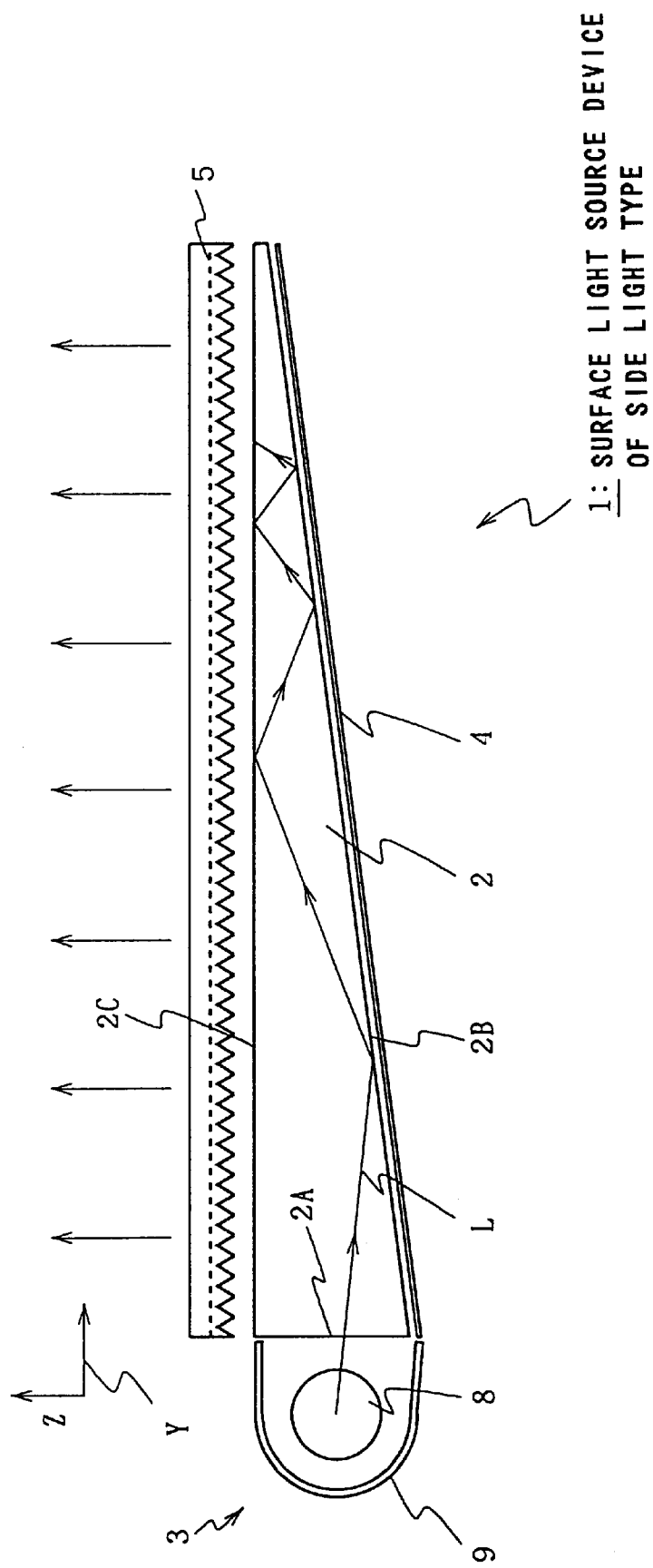
FIG. 4 is a sectional view along line A—A in FIG. 1.

In the description of the embodiments, the reference numerals used in FIGS. 3 and 4 are used in common suitably. Moreover, the duplicate description is omitted.

Figure 1:
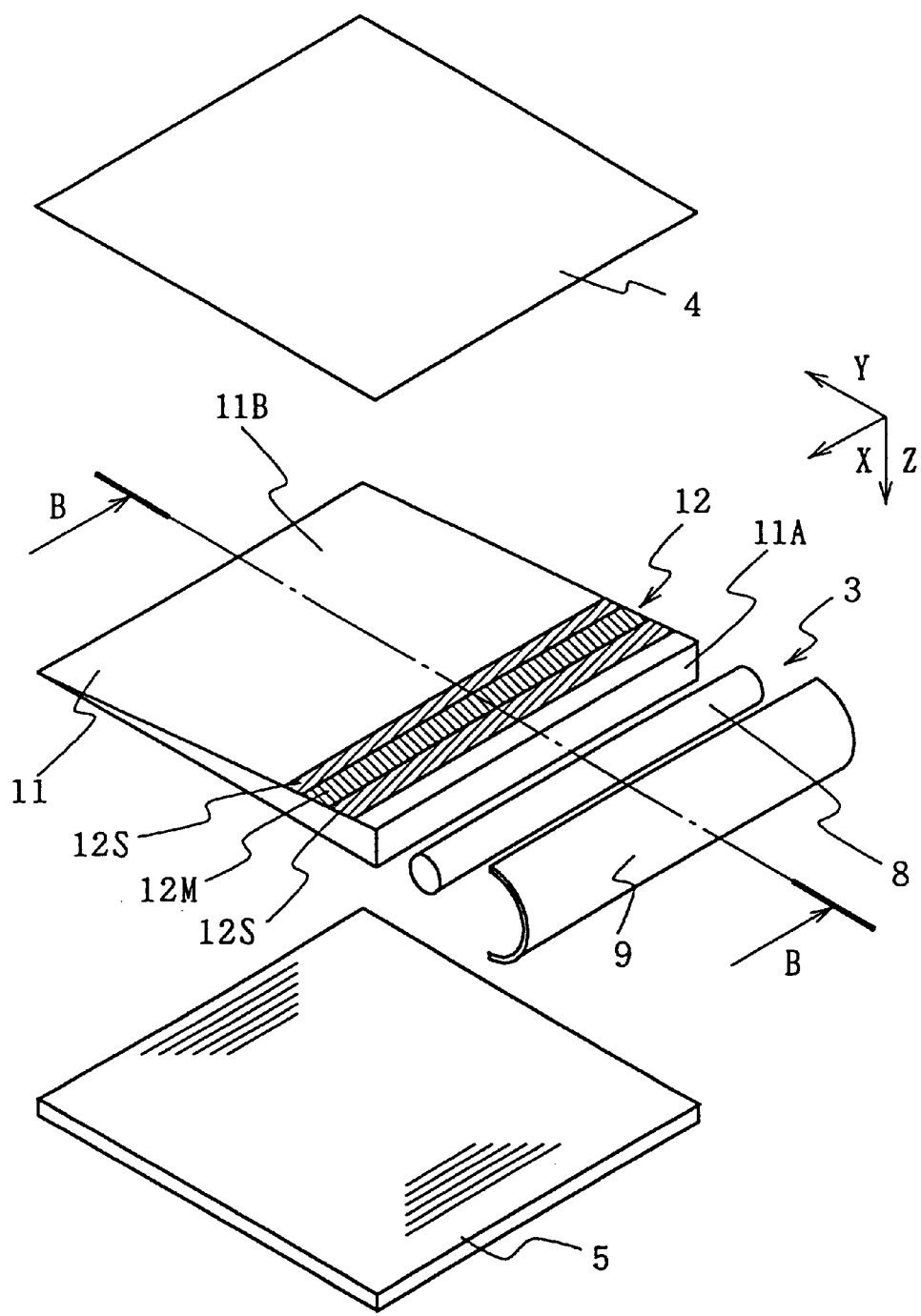
FIG. 1 an assembly perspective view viewed from a rear side of a surface light source device of side light type according to the first embodiment of the present invention.

Referring to FIG. 1 showing the first embodiment, a surface light source device of side light type 10 has a reflection sheet 4, light scattering guide plate 11 and prism sheet 5, and they are laminatedly arranged. This basic structure is common to a surface light source device of side light type 1 shown in FIG. 3 except that the light scattering guide plate 11 is employed instead of the light scattering guide plate 2.

The light scattering guide plate 11 may be the same as the light scattering guide plate 2 shown in FIG. 3 except that a light diffusible area 12 is formed on a part of a slanted surface 11B. The surface other than the light diffusible area 12 may be an approximately plane mirror. As the reflection sheet 4, a member to which a regular reflecting characteristic is given by silver vacuum evaporation is employed.

The light diffusible area 12 is composed of a mat-finished surface (rough surface) to which certain roughness is given by the mat process. As shown by the sectional drawing (B) in FIG. 2, the light diffusible area 12 is positioned separately from an incidence surface 11A by a certain distance D so as to be parallel with the incidence surface 11A. The light diffusible area 12 is composed of a main diffusible area 12M having a certain width, and a supplementary diffusible area 12S provided to both sides of the main diffusible area 12M. The supplementary light diffusible areas 12S serve as buffer areas for avoiding a steep change in light diffusibility (diffusible power).

Figure 2:
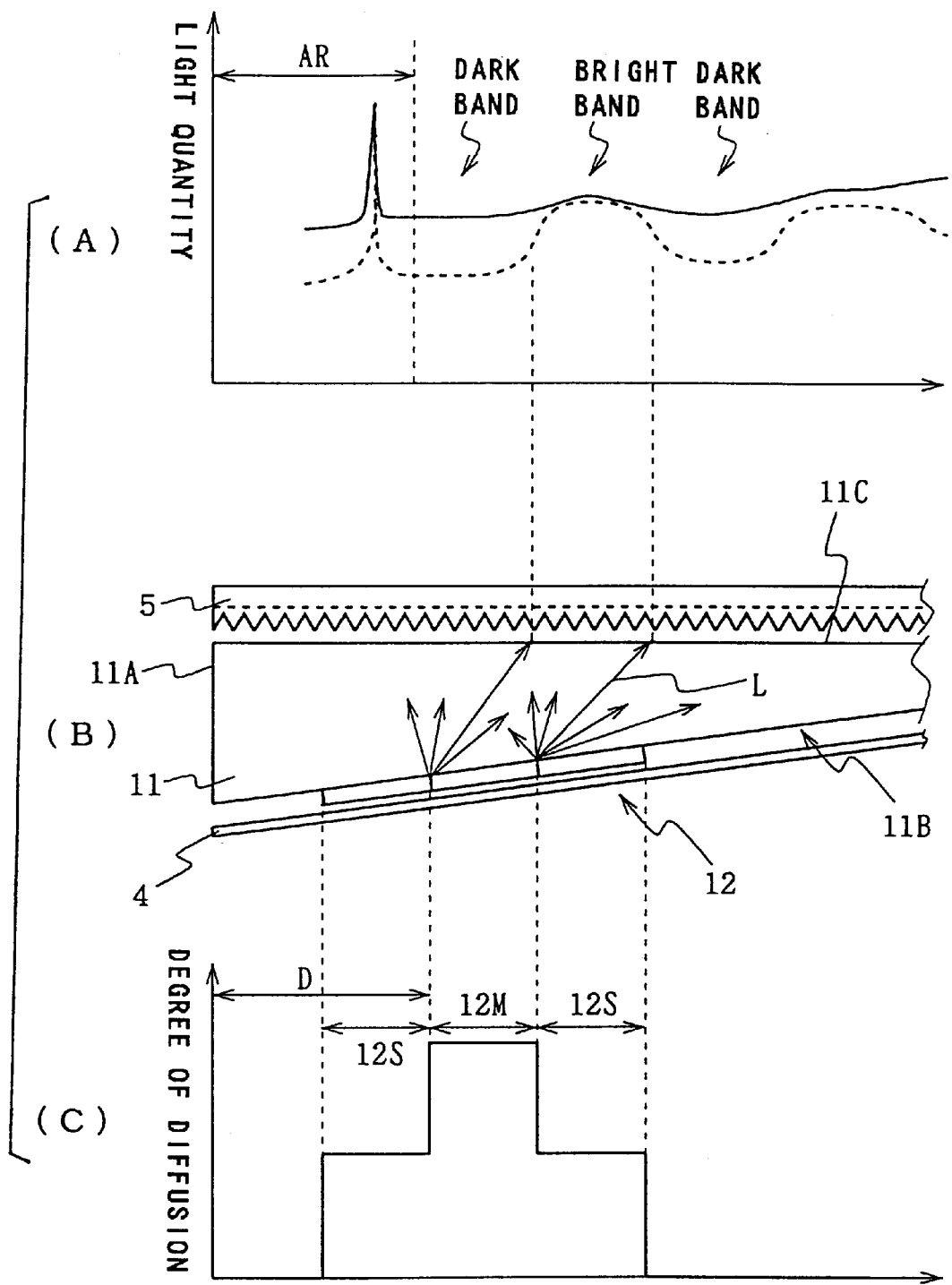
FIG. 2 is a sectional view along line B—B in FIG. 1 and a graph showing corresponding characteristic curve.

The abscissa in the graphs (A) and (C) in FIG. 2 corresponds to the sectional view (B), and represents a distance from the incidence surface 11A. The ordinate in the graph (A) represents a light quantity (luminance). Moreover, the broken line represents a characteristic in the conventional structure, and the solid line represents a characteristic in the present embodiment. Meanwhile, the ordinate in the graph (C) represents strength of the light diffusibility (diffusible power) given to the slanted surface 11B.

As is clear from these drawings, if the main light diffusible area 12M has not been formed (conventional structure), a bright band would appear in a position on an emitting surface 11C closest to the incidence surface 11A (first). A preferable position in which the main light diffusible area 12M is formed is between the position of the bright band and the incidence surface 11A. The supplementary light diffusible area 12S is formed on both the sides of the main light diffusible area 12M as area to which intermediate light diffusibility is given.

Such position of the light diffusible area 12 is selected based on the following analysis. An illumination light guided into the light scattering guide plate 11 is reflected repeatedly between the emitting surface 11C and slanted surface 11B and is propagated to the point of the wedge shape. At this time, a component, which entered to the emitting surface 11C at an angle of not more than critical angle, is emitted from the emitting surface 11C. Supposing from this point, bright bands appear in areas where a group of light beams which have been reflected in the vicinity of the incidence surface 11A by the slanted surface 11B reach the emitting surface 11C.

According to a number of times that the group of light beams have been reflected by the slanted surface 11B, some areas are formed periodically. Needless to say, these areas form the bright bands in which an illumination light quantity (luminance) is excessive, and dark bands in which an illumination light quantity (luminance) is insufficient is formed between the areas.

Therefore, it is considered that a reflection area by the slanted surface 11B immediately previous to a position of a certain bright band is a source of generating that bright band and a bright band farther from the incidence surface 11A than that bright band. Accordingly, when the light diffusibility is given to the area on the slanted surface 11B to be the source of that bright band, the generation of the bright-and-dark band is restrained. The area on the slanted surface 11B to be the source of such a bright band is, needless to say, in a position between the bright band on the most inner side which is desired to delete and the incidence surface 11A. The drawings in FIG. 2 show this.

The main-and-supplementary diffusible areas 12M and 12S scatter illumination light entering there and distribute the light to the areas (corresponding to dark bands) in which a light quantity on the emitting surface 11C is required, and thus lower the bright-and-dark-band contrast. Moreover, a bright-and-dark-band which is generated periodically and continuously is also suppressed.

The light diffusible area 12S for buffering avoids an steep change in the light diffusibility, and when the light guide plate 11 is observed from the side of the emitting surface 11C, the main diffusible area 12M is prevented from being noticeable. As to roughness which is given to the main diffusible area 12M, it is preferable that an arithmetic means Ra is in the range of 0.08 $\mu$m to 0.16 $\mu$m. Moreover, roughness which is smaller than the above roughness is given to the supplementary diffusible area 12S. As to the roughness of the supplementary diffusible area 12S, it is preferable that the arithmetic means Ra is in the range of 0.06 $\mu$m to 0.09 $\mu$m. As to roughness of the surface to be an approximately plane mirror other than the above areas, it is preferable that the arithmetic means Ra is about 0.006 $\mu$m.

The point to which attention should be paid is, as shown in the graph (A) of FIG. 2, that a sharp luminance peak appears in a more inner side than the bright band in the most inner side (near the incidence surface 11A). This peak is generated by irradiating an upper edge and lower edge of the incidence surface 11A by the illumination light.

In the present embodiment, in order to prevent the peak from being observed above the incidence surface 11C, a required area AR from the incidence surface 11A is bordered with a frame (not shown) and masked. Here, as to an example of the frame having the masking function, refer to FIG. 6.

As mentioned above, according to the present embodiment, if the light diffusible area 12 which reflects the characteristic of the present invention does not exist, the bright-and-dark band pattern will appear with the contrast but this pattern is restrained efficiently.

It is understandable from the above description that the following corrections are allowed in connection with the present embodiment.

(a) One or both of the main diffusible area 12M and supplementary diffusible area 12S may have the light diffusibility having a continuous or step-like gradient. For example, the light diffusibility (light diffusible power) may be decreased gradually going away from the main diffusible area 12M to become a plane mirror smoothly.

(b) A light diffusible member may be arranged along the emitting surface 11C. The light diffusible member can prevent the edge of the light diffusible area 12M from being noticeable. Therefore, the supplementary diffusible area 12S might be omitted.

(c) The light diffusible area 12 may be formed by a method other than the mat surface process. For example, the rough surface may be formed by the blast process using sand paper or chemical etching process. Moreover, instead of making the rough surface, the light diffusible area may be formed by applying a light diffusible material such as white ink.

(d) The light diffusible area may not be necessarily formed directly on the light scattering guide plate. For example, printing is given to the reflection sheet as the reflection member, and the light diffusible area may be formed integrally with the reflection sheet.

(e) By forming a slanted surface on the rough surface and depositing a metallic film, etc. thereon, the light diffusible area may be formed so that the slanted surface is integral with the reflection sheet.

(f) A reflection sheet other than the film on which silver has been vacuum-evaporated may be employed. For example, other various regular reflection members and irregular reflection members such as white PET may be employed.

(g) The surface other than the light diffusible area may be a plane mirror. For example, the Light diffusibility may be given to the incidence surface of the light scattering guide plate.

(h) Instead of a dual-side prism sheet as the directional characteristic correcting member, a single-side prism sheet may be employed.

(i) As to the corpuscles dispersed to give the light diffusible power into the light scattering guide plate, instead of transparent particles, other particles such as silica may be used.

(j) The cross sectional form of the light scattering guide plate does not have to be the aforementioned simple wedge shape. For example, a light scattering guide plate having such a general tendency that its thickness is decreased according to the distance from the incidence surface or a flat-plate-type light scattering guide plate may be used. A material of the light guide plate may be a transparent light guide material instead of the light scattering guide material.

(k) An illumination light may be supplied to a light guide plate from a plurality of its side end surfaces.

(l) The surface light source device of side light type according to the present invention may be applied not only to back lighting of liquid crystal devices mentioned but also to various illuminating equipment, other display devices, etc.

Figure 5:
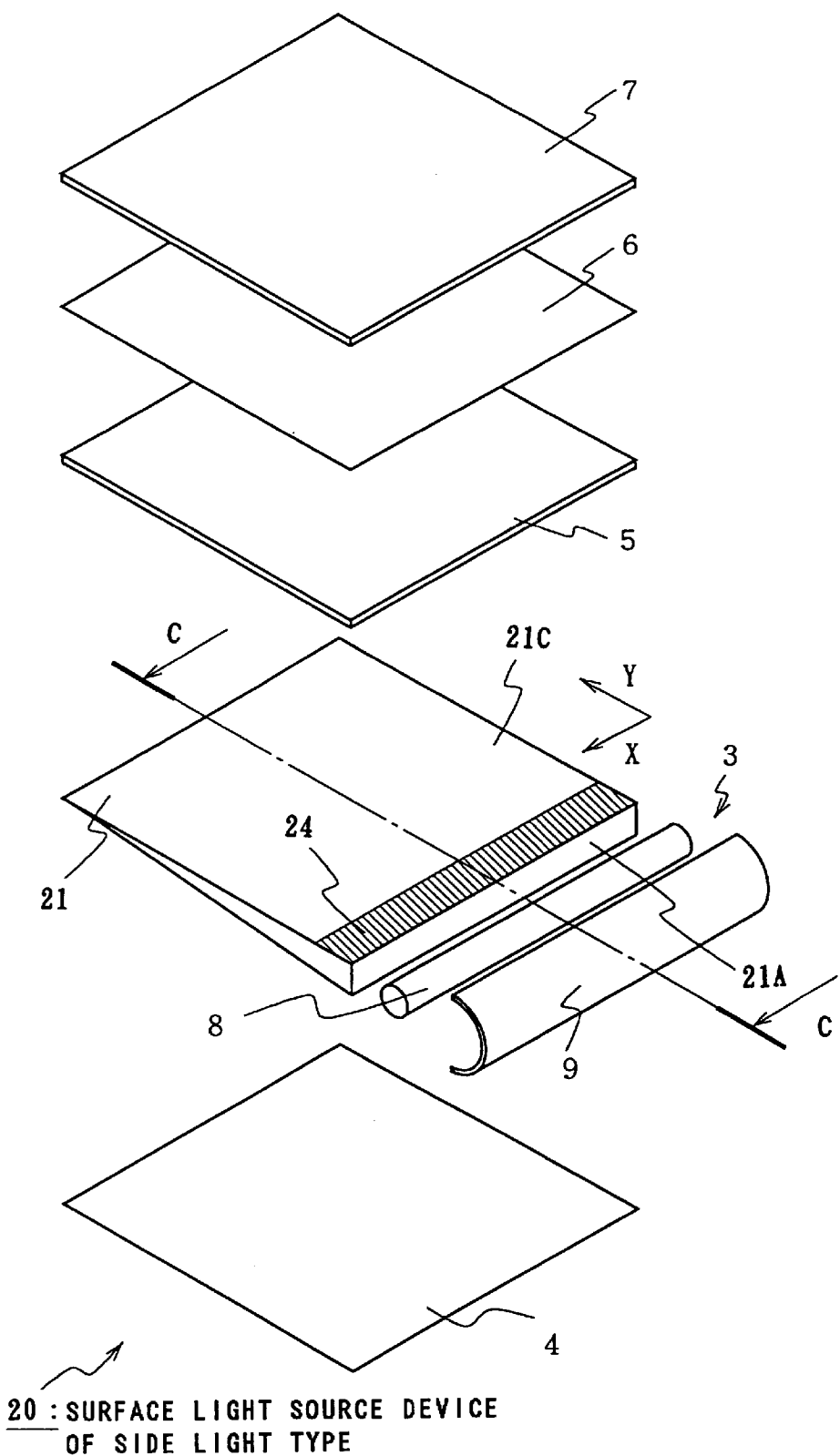
FIG. 5 is a perspective view showing the surface light source device of side light type according to the second embodiment of the present invention.

Next, referring to FIG. 5, a surface light source device of side light type 20 according to the second embodiment has the reflection sheet 4, a light scattering guide plate 21, the prism sheet 5, a diffusible plate 6 and prism sheet 7, and they are laminatedly arranged. This basic structure is common to the surface light source device of side light type 1 shown in FIG. 3 except that the light scattering guide plate 21 is employed instead of the light scattering guide plate 2, and that two prism sheets 5 and 7 instead of one prism sheet 5 and the diffusible sheet 6 are arranged.

The light scattering guide plate 21 may be the same as the light scattering guide plate 2 shown in FIG. 3 except that a light diffusible area 24 is formed on a portion of an emitting surface 21C. The whole surface excluding the light diffusible area 24 may be approximately a plane mirror. As the reflection sheet 4, a white PET film is employed.

The prism sheets 5 and 7 are single-side prism sheets. The prism surfaces of the prism sheets 5 and 7 are respectively aligned inwardly (direction of the emitting surface 21C) and outwardly (opposite with the emitting surface 21C). The extending direction of the convex portion is substantially parallel with an incidence surface 21A on the prism sheet 5, and substantially vertical to the incidence surface 21A on the prism sheet 7. The prism sheets 5 and 7 point an illumination light two-dimensionally to the frontal direction. The diffusible sheet 6 between the prism sheets 5 and 7 softens visibility of the illumination light and relieves the directivity slightly.

The light diffusible area 24 is composed of a mat finished surface (rough surface) to which certain roughness is given by the mat process. As shown in the sectional view (C) of FIG. 6, the light diffusible area 24 is composed of a main diffusible area 24M having a certain width F and a supplementary diffusible area 24S which follows the main diffusible area 24M. They are formed so as to be parallel with the incidence surface 21A.

The supplementary diffusible area 24S serves as a buffer area for avoiding an steep change in light diffusibility (diffusible power). Namely, the supplementary diffusible area 24S has function for shading off a boundary between the light diffusible area 24 and the other area (plane mirror) so as to make it unnoticeable.

Figure 6:
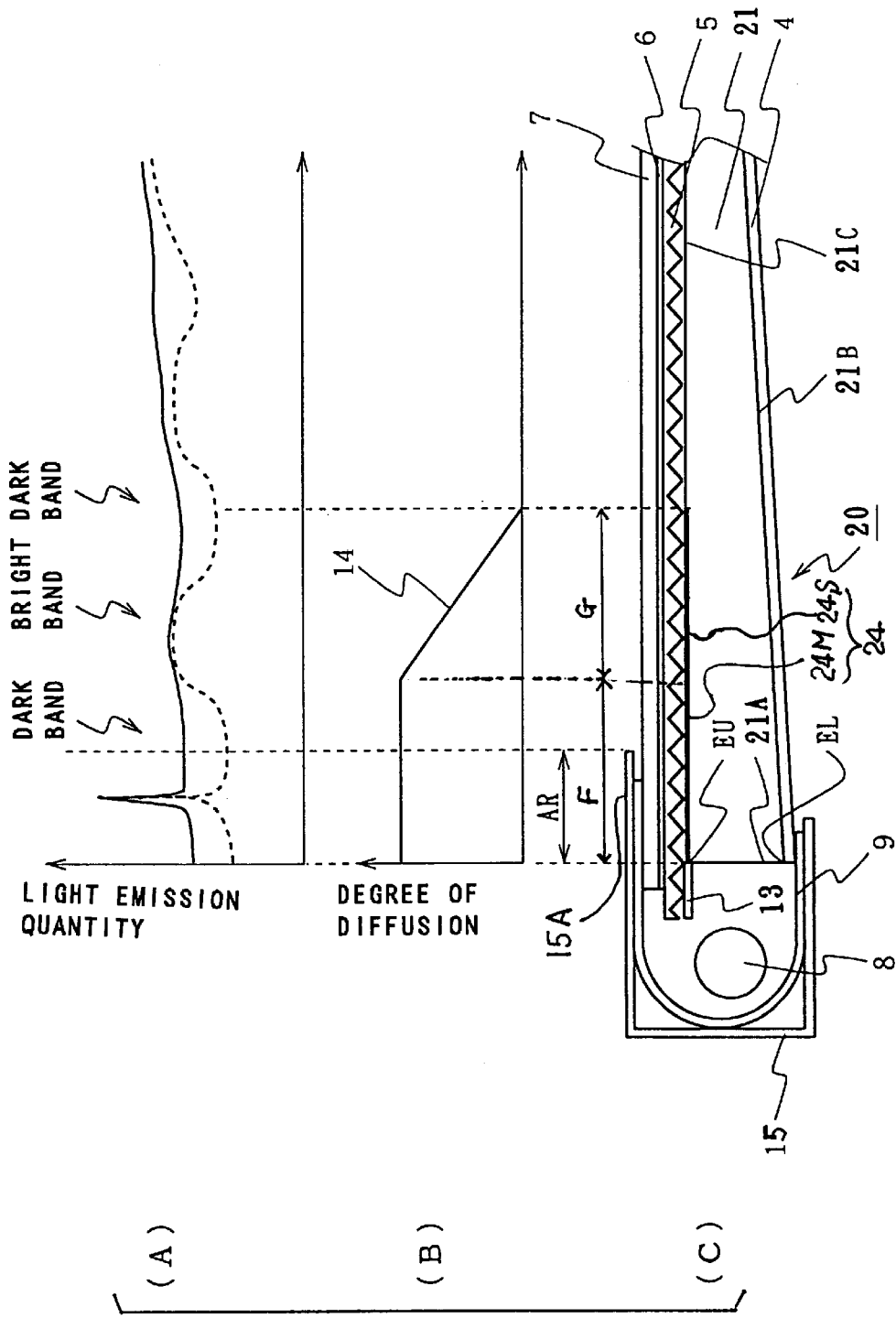
FIG. 6 is a sectional view along line C—C in FIG. 5 and a graph showing corresponding characteristic curve.

The abscissa in the graphs (A) and (C) in FIG. 6 corresponds to the sectional view (C), and represents a distance from the incidence surface 21A. The ordinate in the graph (A) represents an emission quantity (luminance). Moreover, the broken line represents a characteristic in the conventional structure, and the solid line represents a characteristic in the present embodiment. Meanwhile, the ordinate in the graph (B) represents strength of the light diffusibility (diffusible power) given to a slanted surface 21B. As shown in the graph (B), the light diffusibility (diffusible power) is constant in the main diffusible area 24M (width F), and it is decreased gradually from the boundary with the supplementary diffusible area 24S (width G).

As is understandable from FIG. 6, a basic function required by the light diffusible area 24 is to lower the bright-and-dark-band contrast which would appear in a position on the emitting surface 21C, which is the closest to the incidence surface 21A (i,e. first), if the light diffusible area 24 was not formed (conventional structure). The widths F and G of the main-and-supplementary diffusible area 24M and 24S is designed so as to fulfill such a function. In other words, it is preferable that the width F is set so that the main diffusible area 24M covers an area of the first dark band from the vicinity of an edge EU and covers a portion of the next bright band on the emitting surface.

The illumination light guided into the light scattering guide plate 21 is reflected repeatedly between the emitting surface 21C and slanted surface 21B, and propagated to the point of a wedge shape. At this time, a component which entered the emitting surface 21C at an angle of not more than the critical angle is emitted from the emitting surface 21C. As mentioned above, the bright band appears in an area where a group of light beams which have been reflected in the vicinity of the incidence surface 21A by the slanted surface 21B reach the emitting surface 21C.

When the light diffusibility is given to a portion of the emitting surface 21C which is before the position corresponding to the first bright band (the side of incidence surface 21A), a light path directing therefrom to the slanted surface 21B is varied, and the emission from the emitting surface 21C is improved. As a result, as shown by a solid line in the graph (A), an emission quantity (luminance) distribution in the area before the position corresponding to the first bright band is made to be flat.

Therefore, it is preferable that the point of the main diffusible area 24M to which relatively strong light diffusibility is given is near the position of the first bright band. The main-and-supplementary diffusible area 24M and 24S scatters the illumination light which enters there, and improves the emission from the emitting surface 21C, whereas varies the light path directing to the slanted surface 21B. As a result, the bright-and-dark-band contrast on the emitting surface 21C is lowered. Moreover, bright and dark bands which appear periodically and continuously are also restrained.

A point to which attention should be paid is, as shown in the graph (A) in FIG. 6, that a sharp luminance peak appears in a more inner side than the bright band in the most inner side (closer to the incidence surface 21A). This peak, as mentioned above, is generated by irradiating the upper and lower edges of the incidence surface 21A by the illumination light.

In the present embodiment, in order to prevent the peak from being observed above the emitting surface 21C, a frame 15 borders a necessary area AR starting from the incidence surface 21A and blocks the light emission with the edge of the reflector 9. As a result, the illumination light which is emitted from the emitting surface 21C through the upper and lower edges EU and EL is obstructed. The frame 15 has the basic function for supporting elements, and the reflector 9 Is sandwiched between its extended portion 15A and the emitting surface 21C.

Further referring to the sectional view (C) in FIG. 6, the prism sheet 5 goes over the incidence surface 21A and is projected so as to approach the fluorescent lamp 8. A silver sheet 13 as the regular reflection member is fixed by dual-side tape to the projected portion along the upper edge EU.

As a result, an illumination light is emitted from the fluorescent lamp 8 and comes to the upper edge EU to be blocked. Thus, the upper edge EU is prevented from being illuminated brightly.

Meanwhile, the lower edge EL is illuminated brightly by the illumination light. However, a component, which is emitted from the edge EL and directly from the emitting surface 21C (main diffusible area 24M), is blocked by the reflector 9 or frame 15. A component, which is reflected by the emitting surface 21C, is diffused by the light diffusibility (main diffusible area 24M) given to the emitting surface 21C, and is scattered by the transparent corpuscles in a more inner side. As a result, an emission line due to the lower edge EL does not appear on the emitting surface 21C.

As is understandable from the aforementioned first and second embodiments, the diffusible areas 12 and 24 for restraining the bright-and-dark-band contrast may be provided to any major surface (emitting surface and slanted surface) of the light guide plate. In the third embodiment, the diffusible area is provided to two major surfaces (emitting surface and slanted surface).

Figure 7:
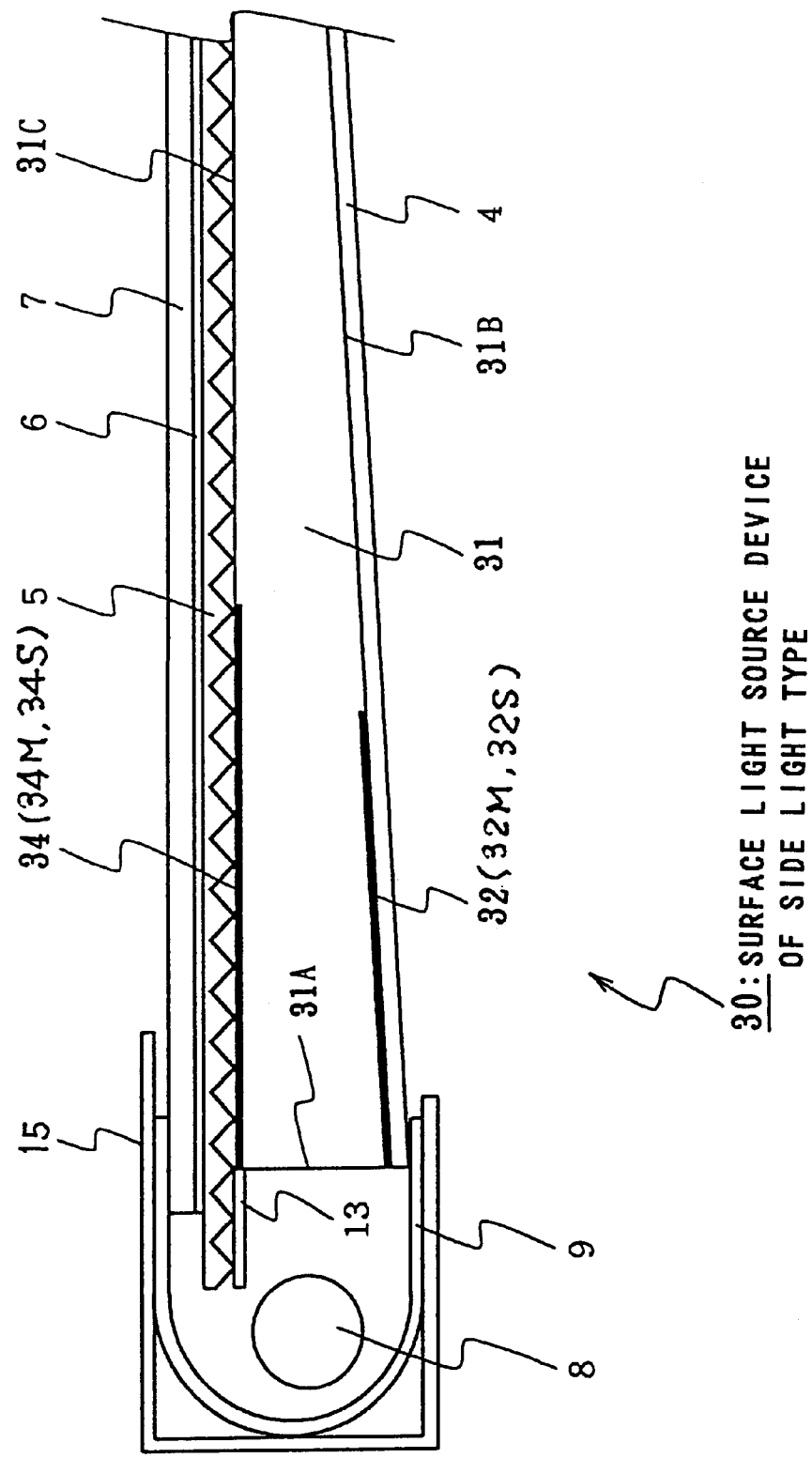
FIG. 7 is a sectional view showing the surface light source device of side light type according to the third embodiment of the present invention.

Referring to FIG. 7, a surface light source device of side light type 30 according to the third embodiment has the reflection sheet 4, a light scattering guide plate 31, the prism sheet 5, the diffusible plate 6 and the prism sheet 7, and they are laminatedly arranged.

This basic structure is common to that of the second embodiment except that the light scattering guide plate 31 is employed instead of the light scattering guide plate 2.

A light diffusible area 32 is formed on a slanted surface 31B, and a light diffusible area 34 is formed on an emitting surface 31C. The light diffusible area 32 is formed in a belt along the incidence surface 31A. Its width is smaller than the light diffusible area 34 only by an about thickness of the incidence surface 31A. Meanwhile, the light diffusible area 34 is composed of two areas (main diffusible area 34M and supplementary diffusible area 34S) similarly to the light diffusible area 24 in the second embodiment. Constant light diffusibility is given to the main diffusible area 34M, and light diffusibility with such a gradient for relieving an steep change in the light diffusibility is given to the supplementary diffusible area 34S.

Similarly to the first and second embodiments, while the illumination light guided into the light guide plate 31 is reflected repeatedly between the slanted surface 31B and emitting surface 31C, the illumination light is propagated towards a point of the wedge shape. During this time, a component, which entered the emitting surface 31C at an angle of not more than the critical angle, is emitted from the emitting surface 31C.

According to the present embodiment, the functions of the first and second embodiments are combined. If any light diffusible area was not formed (conventional structure), a bright band would appear in a position on the emitting surface 31C closest to the incidence surface 31A (first). The regular reflectivity is weakened in the range between the position of the bright band and the incidence surface 31A on both the slanted surface 31B and emitting surface 31C, and the light diffusibility is given.

Therefore, a cause of strengthening the bright-and-dark-band contrast is removed on both the slanted surface 31B and emitting surface 31C. Although the removal of the bright-and-dark-band contrast is insufficient in the first or second embodiment, according to the present embodiment, the contrast can be expected to be suppressed efficiently. Such "heavy" bright-and-dark-band contrast possibly appears depending on angle distribution of an illumination light which is guided from the incidence surface 31A with respect to the form of the light guide plate 31.

In connection with the second and third embodiments, similarly to the first embodiment, it is understandable from the above description that the following corrections are allowed. (a) One or both of the main diffusible areas 24M and 34M and the supplementary diffusible area 24S and 34S may have light diffusibility having a continuous or step-like gradient. For example, the light diffusibility (light diffusible power) may be decreased gradually with going away from the main diffusible areas 24M and 34M to become plane mirrors smoothly.

(b) If the main diffusible areas 24M, 32M and 34M become directly to the plane mirrors, when the boundary which can be ignored practically is observed, the supplementary diffusible areas 24S, 32S and 34S may be omitted.

(c) The light diffusible areas 24, 32 and 34 may be formed by a method other than the mat surface process. For example, the rough surface may be formed by the blast process using sand paper or chemical etching process. Moreover, instead of making the rough surface, by applying a light diffusible material such as white ink, the light diffusible area may be formed.

(d) The light diffusible area may not be necessarily formed directly on the light scattering guide plates 21 and 31. For example, the reflection sheet 4 as the reflection member is subject to printing, and the light diffusible area may be formed integrally with the reflection sheet 4. Moreover, as to the emitting surfaces 21C and 31C, an illumination light correcting member such as the prism sheet 5 is subject to the printing, and the light diffusible area may be formed integrally with the illumination light correcting member.

(e) By forming the slanted surfaces 21B and 31B on the rough surface and vacuum-evaporating a metallic film, etc. thereon, the slanted surface is made to be integral with the reflection sheet, and the light diffusible area may be formed.

(f) The surface other than the light diffusible areas 24, 32 and 34 may not be a plane mirror. For example, the light diffusibility may be given to the incidence surfaces 21A and 31A of the light scattering guide plates 21 and 31.

(g) Reflection sheets other than the white PET film may be employed. For example, another various irregular reflection member and regular reflection member such as a silver-deposited film may be employed.

(h) The arrangement of a directional characteristic correcting member may be modified in various forms. For example, instead of the prism sheets 5 and 7, a dual-prism sheet may be arranged. Moreover, only one of the prism sheets 5 and 7 may be arranged.

(i) The corpuscles which, are dispersed in order to give the light scattering power into the light scattering guide plates 21 and 31, may be corpuscles such as silica instead of transparent corpuscles.

(j) The cross sectional form of the light scattering guide plates 21 and 31 do not have to be the aforementioned simple wedge shape. For example, a light scattering guide plate having such a general tendency that its thickness is decreased according to the distance from the incidence surface or a flat-plate-type light scattering guide plate may be used. A material of the light guide plate may be a transparent light guide material instead of the light scattering guide material.

(k) An illumination light may be supplied to a light guide plate from a plurality of its side end surfaces.

(l) The surface light source device of side light type according to the present invention may be applied not only to back lighting of liquid crystal devices mentioned but also to various illuminating equipment and other display devices, etc.

As detailed above, according to the present invention, when the light diffusible area for suppressing the bright-and-dark-band contrast is provided to one or both of the two major surfaces of the light guide plate, emission quantity distribution is made to be uniform, and thus an illumination light with high quality can be obtained.

What is claimed is:

1. A surface light source device of side light type comprising:

a light guide plate having an incidence surface and major surfaces including an emitting surface and a surface opposite to the emitting surface, the incidence surface running along the major surfaces in an incidence direction; and a rod-type light source arranged along the incidence surface supplying light through the incidence surface, wherein a belt-like light diffusible area preventing a bright-and-dark-band contrast from appearing, is arranged in direct contact with at least one of the major surfaces so as to be parallel to the incidence direction.

2. A surface light source device of side light type according to claim 1, wherein belt-like light diffusible areas preventing a bright-and-dark-band contrast from appearing are respectively arranged in direct contact with the major surfaces so as to be parallel to the incidence direction.

3. A surface light source device of side light type according to claim 1, further comprising:

a reflection member arranged along the surface opposite to the emitting surface, wherein belt-like light diffusible areas preventing a bright-and-dark-band contrast from appearing are respectively arranged in direct contact with the major surfaces so as to be parallel to the incidence direction.

4. A surface light source device of side light type according to claim 1, wherein said light guide plate is formed so that a thickness becomes thinner gradually going away from the incidence surface.

5. A surface light source device of side light type according to claim 1, wherein said light guide plate is composed of a light guide material having a light scattering characteristic therein.

6. A surface light source device of side light type according to claim 1, wherein said light guide material having a light scattering characteristic therein and is formed so that a thickness becomes thinner gradually going away from the incidence surface.

7. A surface light source device of side light type comprising:

a light guide plate having an incidence surface and major surfaces including an emitting surface and a surface opposite to the emitting surface, the incidence surface running along the major surfaces in an incidence direction; and a rod-type light source arranged along the incidence surface supplying light through the incidence surface, wherein a belt-like light diffusible area preventing a bright-and-dark-band contrast from appearing is arranged in direct contact with at least one of the major surfaces so as to be parallel to the incidence direction, said belt-like light diffusible area including a main diffusible area and a supplementary diffusible area adjacent to the main diffusible area and serving as a buffer area preventing a steep change in light diffusibility.

8. A surface light source device of side light type according to claim 7, wherein belt-like light diffusible areas preventing a bright-and-dark-band contrast from appearing are respectively arranged in direct contact with the major surfaces so as to be parallel to the incidence direction.

9. A surface light source device of side light type according to claim 7, further comprising:

a reflection member arranged along the surface opposite to the emitting surface, wherein a belt-like light diffusible area preventing a bright-and-dark-band contrast from appearing is arranged in direct contact with each of the major surfaces so as to be parallel to the incidence direction.

10. A surface light source device of side light type comprising:

a light guide plate having an incidence surface and major surfaces including an emitting surface and a surface opposite to the emitting surface, the incidence surface running along the major surfaces in an incidence direction; and a rod-type light source arranged along the incidence surface supplying light through the incidence surface, wherein a belt-like light diffusible area preventing a bright-and-dark-band contrast from appearing is arranged in direct contact with the emitting surface so as to be parallel to the incidence direction.

11. A surface light source device of side light type according to claim 10, further comprising:

a directional characteristic correcting member arranged along the emitting surface, wherein the belt-like light diffusible area in direct contact with the emitting surface is formed on said directional characteristic correcting member.

12. A surface light source device of side light type comprising:

a light guide plate having an incidence surface and major surfaces including an emitting surface and a surface opposite to the emitting surface, the incidence surface running along the major surfaces in an incidence direction; and a rod-type light source arranged along the incidence surface supplying light through the incidence surface, wherein a belt-like light diffusible area preventing a bright-and-dark-band contrast from appearing is arranged in direct contact with the emitting surface so as to be parallel to the incidence direction, said light diffusible area including a main diffusible area and a supplementary diffusible area adjacent to the main diffusible area serving as a buffer area preventing a steep change in light diffusibility.

13. A surface light source device of side light type according to claim 12, further comprising:

a directional characteristic correcting member arranged along the emitting surface, wherein the light diffusible area in direct contact with the emitting surface is formed on said directional characteristic correcting member.

14. A surface light source device of side light type comprising:

a light guide plate having an incidence surface and major surfaces including an emitting surface and a surface opposite to the emitting surface, the incidence surface running along the major surfaces in an incidence direction; and a rod-type light source arranged along the incidence surface supplying light through the incidence surface, wherein a belt-like light diffusible area preventing a light-and-dark-band contrast from appearing is arranged in direct contact with the surface opposite to the incidence direction.

15. A surface light source device of side light type according to claim 14, further comprising:

a reflection member arranged along the surface opposite to the emitting surface, wherein the light diffusable area in direct contact with the surface opposite to the emitting surface is formed on said reflection member.

16. A surface light source device of side light type comprising:
  a light guide plate having an incidence surface and major surfaces including an emitting surface and a surface opposite to the emitting surface, the incidence surface running along the major surfaces in an incidence direction; and
  a rod-type light source arranged along the incidence surface supplying light through the incidence surface, wherein
    a belt-like light diffusible area preventing a bright-and-dark-band contrast from appearing is arranged in direct contact with the surface opposite to the emitting surface so as to be parallel to the incidence direction,
    said belt-like light diffusible area including a main diffusible area and a supplementary diffusible area adjacent to the main diffusible area serving as a buffer area preventing a steep change in light diffusibility.

17. A surface light source device of side light type according to claim 16, further comprising:
  a reflection member arranged along the surface opposite to the emitting surface,
  wherein the light diffusible area in direct contact with the surface opposite to the emitting surface is formed on said reflection member.

* * * * *